US006441122B1

(12) United States Patent
DeMott et al.

(10) Patent No.: US 6,441,122 B1
(45) Date of Patent: Aug. 27, 2002

(54) MELAMINE IN UREA-EXTENDED PHENOL/FORMALDEHYDE FIBERGLASS BINDERS

(75) Inventors: Gerard J. DeMott, Evergreen; Thomas John Taylor, Englewood; Glenn S. Aspholm, Littleton, all of CO (US)

(73) Assignee: Johns Manville International, Inc., Denver, CO (US)

( * ) Notice: Subject to any disclaimer, the term of this patent is extended or adjusted under 35 U.S.C. 154(b) by 0 days.

(21) Appl. No.: 08/369,202

(22) Filed: Jan. 5, 1995

(51) Int. Cl.⁷ .......................... C08G 14/02; C08G 8/04
(52) U.S. Cl. ...................... 528/137; 528/129; 528/230; 524/596; 524/598; 524/818; 524/841
(58) Field of Search .................................. 528/129, 137, 528/230; 525/480, 509, 534, 540; 524/596, 597, 598, 818, 841

(56) References Cited

U.S. PATENT DOCUMENTS 5,300,562 A  *  4/1994  Coventry et al. ........... 524/841

* cited by examiner

Primary Examiner—James J. Seidleck
Assistant Examiner—U. K. Rajguru
(74) Attorney, Agent, or Firm—Robert D. Touslee

(57) ABSTRACT

Urea-extended phenol/formaldehyde alkaline resole binders suitable for fiberglass and having a high binding efficiency are disclosed. These binders are prepared by adding a minor quantity of melamine in an amount such that the binder solution contains no solid melamine particulates at room temperature. The resulting binders, when applied to fiberglass and cured, have a binding efficiency close to 100%, and further increase the recovery and physical properties of the binder-containing fiberglass product.

10 Claims, No Drawings

MELAMINE IN UREA-EXTENDED PHENOL/FORMALDEHYDE FIBERGLASS BINDERS

FIELD OF THE INVENTION

The subject invention pertains to binders suitable for use in fiberglass products, which incorporate minor amounts of melamine in urea-extended phenol/formaldehyde compositions. More particularly, the subject invention pertains to water-soluble binders containing urea-extended phenol/formaldehyde alkaline resoles to which minor amounts of melamine have been added, and to fiberglass products treated with these binders. Use of the binder compositions of the present invention result in fiberglass products having enhanced characteristics.

BACKGROUND OF THE INVENTION

Fiberglass comes in many shapes and sizes and can be used for a variety of applications. A general discussion of fiberglass manufacturing and technology is contained in *Fiberglass* by J. Gilbert Mohr and William P. Rowe, Van Nostrand Reinhold Company, New York 1978, which is herein incorporated by reference. During the preparation of fiberglass, whether by a blown fiber or continuous filament manufacturing process, the resulting glass fibers may easily be degraded in their strength characteristics by the self-abrasive motion of one fiber passing over or interacting with another. As a result of this self-abrasion, surface defects are caused in the fiberglass filaments resulting in reductions in overall mechanical strength. Furthermore, fiberglass which is destined for use as building insulation and sound attenuation is often shipped in a compressed form to lower shipping costs. When the compressed bundles of fiberglass are utilized at the job site, it is imperative that the fiberglass product recover a substantial amount of its precompressed thickness. Otherwise, loss of insulation and sound attenuation properties may result.

Traditionally, fiberglass has been treated with phenol/formaldehyde resole binders to alleviate the previously-mentioned defects. The phenol/formaldehyde binders utilized in the past have been the highly alkaline resole type which have the combined advantages of inexpensive manufacture and water solubility. Typically, the binders are applied to the fiberglass from aqueous solution shortly after the fibers have been produced, and cured at elevated temperature in a curing oven. Under the curing conditions, the aqueous solvent is evaporated, and the phenol/formaldehyde resole cures to a thermoset state. The fibers in the resulting fiberglass product are thus partially coated with a thin layer of thermoset resin, which tends to accumulate at the junctions where fibers cross each other. The resulting product therefore not only suffers from less self-abrasion, but also exhibits higher recovery than a fiberglass product not incorporating a binder.

The alkaline phenol/formaldehyde resoles contain a fairly large excess of formaldehyde from the manufacturing process. This excess of formaldehyde has been taken advantage of by adding urea to the phenol/formaldehyde resole, resulting in a urea-extended resole. Urea-extended phenol/formaldehyde binders are more cost-effective than the straight phenol/formaldehyde resins, but exhibit some loss in properties as the urea content increases. Thus, efforts have been made to incorporate other resins which can enhance the properties of the binder.

For example, in U.S. Pat. No. 3,819,441, fiberglass binder compositions containing highly-advanced phenol/formaldehyde resole resins which are insoluble in water at a pH of between 7 and 8 have been utilized. The insoluble resoles are optionally extended with melamine, dicyandiamide, or urea, acidified, and mixed with a surfactant, following which the resin is dispersed in water and applied to glass fibers. The high degree of advancement requires extended processing time in preparing the resole, thus increasing manufacturing costs, and the water insolubility requires addition of a surfactant. Furthermore, as the aqueous binder composition is a dispersion rather than a solution, it may suffer from traditional defects of dispersions, i.e., non-uniform composition, susceptibility to settling or phase separation, and plugging of spray nozzles. In addition, the dispersion cannot uniformly coat the glass fibers in the applied state, and must rely on fusion of the resin composition and subsequent flow prior to cure to effect the same type of coverage that can be obtained from alkaline resole solutions.

An anti-punking resin, and fiberglass products treated therewith, are described in U.S. Pat. Nos. 3,907,724 and 3,919,134. The resin disclosed in these references is prepared at low formaldehyde to phenol ratios under alkaline conditions following which it is modified with large amounts (15% or more) of melamine or dicyandiamide, optionally additionally with urea. Etherified methylol melamine in the amount of at least 10 weight percent is then added. The resulting resin composition is only modestly water tolerant, and proteinaceous dispersants are added to maintain stable dispersions at higher dilution. The use of a large amount of melamine and etherified methylol melamine makes preparation of these binders expensive, and the necessity of the use of a proteinaceous dispersant not only increases the cost, but renders the treated fiberglass susceptible to growth of microorganisms. As the resulting composition is a dispersion rather than a solution, it suffers from the defects of dispersions previously noted.

An anti-punk resin system employing a novolac resin as a starting material for a resole is described in U.S. Pat. No. 3,956,204. Phenol and less than equimolar formaldehyde are reacted under acidic i[co]nditions to form a water-insoluble novolac containing a high proportion of dihydroxydiphenylmethane isomers. Following preparation of the novolac, excess formaldehyde is added to form a resole, following which a nitrogenous substance (greater than 20 weight percent calculated on the basis of melamine) is reacted and optionally extended with urea, following which the pH is adjusted to between 7 and 8. Crystallization of the resole is prevented by the presence of 2,2'- and 2,4'-dihydroxydiphenylmethanes which are present in the mixture due to the formation of the initial novolac under the required acidic conditions. Example 1 of the patent illustrates that traditional one-step alkaline process resoles are unsuitable for this application. The necessity of using a multistage reaction is undesirable economically, and the large amount of melamine increases the cost.

In U.S. Pat. No. 4,285,848, is disclosed a wood adhesive prepared by sequential reaction of phenol with a large excess of formaldehyde under acidic conditions, followed by subsequent reaction under alkaline conditions. Melamine is then added in large amounts (100 to 160 mole percent based on phenol) and reacted at elevated temperature, following which urea is added, again at elevated temperature. The reaction sequence is stated to be critical, and water tolerance is unspecified. The multistage reaction conducted at elevated temperature and the relatively large amount of melamine result in a higher cost product.

In U.S. Pat. No. 4,324,833, is disclosed a wet process mat binder incorporating a phenolic resin extended with urea, a partially methylated melamine formaldehyde resin, and polyvinyl alcohol, deposited on fiberglass at a pH within the range of 3.5 to 6.5, with starch as an extender. Incorporation of methylated melamine formaldehyde resin and polyvinyl alcohol result in a product of higher cost. The use of starch as an extender, as with proteinaceous dispersants, renders the product potentially susceptible to attack of microorganisms.

In U.S. Pat. No. 5,296,584, are disclosed fiberglass binders containing alkaline resoles to which melamine is added in such a manner that it is dispersed but not reacted, and the resulting dispersion rendered acidic. It is further disclosed that the melamine "cures" with the resole by being solubilized in the resole components at elevated temperature and cross-linking. Cross-linking is said not to occur at neutral or elevated pH, requiring the final pH to be acidic. The resulting dispersions are useful as adhesives in binding glass fiber mats.

It is therefore an object of the invention to prepare fiberglass binder solutions which utilize, as the basic starting material, readily available alkaline resoles which are extended with urea, to which small but effective amounts of melamine are added such that the resulting binder is soluble in water, rather than being a dispersion. These and other objects are achieved by the invention as more fully set forth below.

SUMMARY OF THE INVENTION

The present invention pertains to compositions useful for use as binders in fiberglass manufacturing, which contain an alkaline phenol/formaldehyde resole extended with urea, to which a minor but effective amount of melamine is added, thus producing a binder solution which when applied to fiberglass results in a product having good recovery, high binder efficiency, and good sag and droop characteristics.

DETAILED DESCRIPTION OF THE PREFERRED EMBODIMENT

The aqueous binder solutions of the present invention are prepared by extending an alkaline phenol/formaldehyde resole containing an excess of formaldehyde with urea to form a "prereact" and adding an amount of melamine up to the solubility limit in the binder system. The mixture is agitated, preferably at room temperature, until the melamine is fully dissolved. The resulting binder composition may be utilized as is, or may be diluted with sufficient water so as to provide the desired solids level when sprayed or wet-immersed onto fiberglass products. Traditionally, phenol/formaldehyde binders are utilized in a solution containing approximately 3% to 20% solids by weight, and sprayed onto fiberglass in order to achieve a solids content of from 0.5% to about 15% by weight of the finished fiberglass product. Depending upon such factors as the binder efficiency and the desired end use application, the amount of binder may be increased or decreased as necessary. For building insulation, for example, a range of binder content between 3% and 7% by weight is common. Such binder contents are generally produced employing a binder solution containing from 10% to 20% solids by weight. The adjustment of the solids content of the binder solution and determination of the desired binder content of the finished fiberglass product can be readily accomplished by those of ordinary skill in the art.

Thus, the subject invention pertains to an aqueous binder solution suitable for applying to fiberglass as a binder, the binder having high binding efficiency, the composition prepared by the steps comprising:

(A) selecting an aqueous resole having a pH greater than 7, prepared by reacting phenol with excess formaldehyde under alkaline conditions;

(B) adding to the aqueous resole (A) urea in an amount from about 20 to about 70 parts by weight based on 100 parts by weight of the phenol/formaldehyde resole solids in component A and reacting to form a urea-extended prereact;

(C) dissolving into the prereact from about 1 to about 10 weight percent melamine based on the weight of the solids in the urea-extended phenol/formaldehyde prereact (B);

wherein the alkaline resole contains sufficient excess formaldehyde to react with the urea and the melamine on a substantially equimolar basis.

The subject invention further pertains to an aqueous binder solution suitable for applying to fiberglass as a binder, the binder having high binding efficiency, comprising a prereact prepared by the admixture of (A) from 50 to about 80 parts by weight based on solids of a water-soluble resole having a pH greater than 7, prepared by reacting phenol with excess formaldehyde under alkaline conditions, the resole containing or adjusted to contain sufficient unreacted formaldehyde to react with (B) from 15 to about 40 parts by weight urea;

(C) from 1 to 4% by weight, based on the weight of solids A and B, of melamine; the binder further comprising (D) water in an amount such that the total of solids in the binder is within the range of 10 weight percent to 50 weight percent, wherein none of the melamine is present in the solid state in the binder solution.

The starting material for the aqueous binders of the subject invention is an alkaline phenol/formaldehyde resole prepared using excess formaldehyde in order to ensure water solubility. By the term "excess formaldehyde" is meant an amount of formaldehyde substantially in excess of an equimolar amount with respect to phenol, preferably an amount such that the formaldehyde/phenol mole ratio is from 2:1 to about 7:1, more preferably from 2:1 to 4:1. Such resoles are to be distinguished from phenol/formaldehyde condensates which are prepared under acidic conditions, or with low levels of formaldehyde, in which case significant quantities of dihydroxydiphenylmethanes are produced. Such products are generally not water soluble.

Preparation of alkaline resoles is within the expertise of one of ordinary skill in the art. The procedure usually entails reaction of phenol and formaldehyde on the basis of one mole of phenol for each approximately two to four moles of formaldehyde, in the presence of a basic catalyst. The formaldehyde is conveniently added as a formalin solution containing from 30 to 50% by weight of formaldehyde. The resulting alkaline resole is water soluble by virtue of containing large quantities of methylolated phenol residues, and generally contains from 30 to 60 weight percent solids, preferably about 50 weight percent solids. The amount of solids is assessed by standard industry methods, for example the standard oven solids test. Such products can be manufactured in situ, or can be purchased, as they are available commercially. An example of the latter is Neste 368ST resin, containing nominally 48 weight percent solids by the oven solids test, a pH within the range of 7.5 to 8.3 and available from the Neste Corporation. The alkaline resoles should contain sufficient formaldehyde to react with the urea to be added on an approximately one-to-one molar basis.

A urea-extended alkaline prereact containing initially 70 parts of phenol/formaldehyde resin solids which is reacted with 30 parts by weight of urea is utilized to form which is known as a 70/30 extended binder. In order to react with this amount of urea, the phenol/formaldehyde resin must generally contain about 15 parts by weight of free formaldehyde. Commercial resins containing less than this amount can be adjusted by adding the requisite amount of formaldehyde to the as-supplied resin. The free formaldehyde content should be substantially equimolar relative to urea/melamine, and thus may range from 0.75 mole to in excess of one mole based on the amount of urea and melamine to be added to extend the resole. Preferably a substantially 1:1 ratio of formaldehyde to urea/melamine is used. While high amounts of formaldehyde are feasible, such higher levels are not desirable as they both increase product cost as well as resulting in higher formaldehyde emissions upon cure. A ratio of free formaldehyde to urea/melamine of from 0.9:1 to 1.2:1 is particularly suitable. Following addition of the urea, the composition is allowed to stand, generally overnight, and is termed a "prereact."

Following addition of the urea, the resultant urea-extended alkaline prereact must yet contain enough formaldehyde to react with the amount of melamine to be added. Melamine is added to the prereact in an amount of from approximately 1% to approximately 10% by weight based on the solids content of the prereact binder solution. The amount of melamine should be selected such that the entire quantity of melamine added dissolves in the prereact, thus forming a true solution as a binder composition. The amount of melamine which will dissolve is dependent to some extent on the pH of the prereact solution. It has been found that prereact solutions having a pH between 7.1 and 9, preferably between 7.5 and 8.3 are most desirable for use in the subject binders. With this pH and at commercially useful solids levels, approximately 4 weight percent of melamine based on solids will dissolve. It is undesirable to add melamine in excess of that which will dissolve in the resin.

The efficiency of a fiberglass binder may be assessed by the binder efficiency test. A portion of glass microfiber filter (Whatman 5.5 cm GF/B) is placed inside a carrier consisting of a 1.5 inch long piece of 0.5 inch diameter Pyrex glass tubing. Approximately 0.5 gram of the final binder solution is placed onto the filter and weighed to the nearest 0.1 milligram. The sample support and sample are placed near the outlet end of a tube furnace which consists of a 1 foot long glass tube having a 1 inch inside diameter wrapped with nickel chromium resistance wire as a heating source and surrounded by a vacuum jacket. The temperature inside the furnace can be monitored by a thermocouple in a thermocouple well placed between the heater wire and the wall of the inside tube. Following insertion of the sample, dry air is used to sweep the inside of the tube which is maintained at a temperature of approximately 200° C., generally for a time period of approximately 10 minutes. The binding efficiency is defined as the percent solids remaining on the fiberglass as compared to the initial solids. It is desirable to have a binding efficiency as high as possible in order to minimize binder requirement as well as to minimize emissions from the binder upon cure. Traditional urea-extended binders have binder efficiencies on the order of 80%.

If desired, volatile organic components (VOCs) released by the curing sample may be trapped and measured using two impingers connected in series downstream from the exit of the tube furnace. Into each of the two impingers is placed 20 milliliters of acetonitrile. After each tube furnace run, a portion of each impinger solution may be analyzed directly for phenol, 2-hydroxymethylolphenol (2-HMP), and 4-hydroxymethylolphenol (4-HMP) using a gas chromatograph mass spectrometer. A second accurately measured aliquot is diluted 1:1 with a 2,4-dinitrophenylhydrazine (2,4-DNPH) solution. The latter solution is composed of 2.50 grams of 2,4-DNPH in 1,000 milliliters of acetonitrile that also contains 5 milliliters of glacial acidic acid to facilitate reaction between 2,4-DNPH and formaldehyde. The reaction between 2,4-DNPH and formaldehyde to form a stable 2,4-dinitrophenylhydrazone derivative is well-known, and the latter is then analyzed by high pressure liquid chromatography (HPLC).

The invention may now be illustrated by the following nonlimiting examples. Numerous modifications and changes to the basic invention may be made by those of ordinary skill in the art without departing from the spirit of the invention.

EXAMPLE 1

To 156.35 gram of an alkaline phenol/formaldehyde resole containing 44.83% solids via the oven solids test and having a nominal pH in the range of 7.5 to 8, is added 75.01 grams of a 40% by weight solution of urea in water, following which an additional 269.00 grams of water is added to form a prereact solution containing 20.00% solids. The prereact solution was allowed to stand overnight, following which samples were mixed with 1, 2, 3, 4, 5, and 10 weight percent melamine powder on a solids basis. It was found that up to 4 weight percent melamine based on solids would dissolve into the prereact over a period of approximately 40 minutes. Higher amounts would not dissolve even after stirring the mixture overnight.

EXAMPLE 2

To a commercial alkaline phenol/formaldehyde resin designed for making a 70/30 urea-extended fiberglass binder and containing 48% solids (Neste 368ST) was added 4 weight percent melamine based on resin oven solids and dissolved, the dissolution taking about 40 minutes. Higher amounts would not dissolve even after stirring overnight. Urea was then added in an amount to extend the resin in the ratio of 70/30 resin/urea. After the normal overnight prereact time, the solution was still clear, with no sign of precipitation or instability.

EXAMPLE 3

The procedure of Example 2 was utilized, however the amount of melamine was varied between 1 and 3% as shown in Table 1. Further examples were prepared under the same conditions employing 3% by weight of melamine based on phenol/formaldehyde resin solids, and employing correspondingly lesser amounts of urea on a 1, 2 and 3 equimolar basis based on melamine, as shown in Table 1.

EXAMPLE 4

Two separate binder solutions were made by employing Neste 368ST resin in an amount of 158.8 parts, to which was added 68.0 parts urea, 288.2 parts water, and 4.5 and 9.0 parts melamine, corresponding to 2% and 4% melamine on a solids basis, respectively. The prereact solutions were allowed to stand overnight. The prereact solutions were each delivered to an inline mixer, along with a solution containing 3.08 weight percent ammonium sulfate and 0.2 weight percent aminopropylsilane (OSI Incorporated, A1101), and a soft water stream. These components were mixed in a ratio of 1.31:0.653:3.69 and delivered to four sets of eight spraying nozzles where they were hydraulically dispersed. The nozzles were arranged in four circles spraying the binders towards the center of the fiberglass from a distance of about 8 inches. The fiberglass was manufactured using a standard fiberglass spinning machine located approximately 12 inches above each circle of nozzles.

Two fiberglass machines were arranged consecutively with product being collected on open chain conveyor belts. By overlaying product from each fiberglass machine, a low-density fiberglass blanket was produced. This blanket was then passed through a standard curing oven, adjusted to give a 7.5 to 8 inch product height. Final blanket weight was 250 pounds per 1,000 square feet. The fully cured blankets were cut into 48×15.25 inch sections, stacked and compressed for packaging. After packaging, samples were opened at regular intervals and allowed to recover in thickness. The recovered thickness, the binder content, and rigidity are shown in Table 2. The rigidity was measured via two methods; sag (cantilever) and droop (saw horse).

TABLE 1

Binder Efficiency Emissions for Melamine-Containing Neste 368ST Binders

| Sample | % solids remaining |
|---|---|
| control | 83.53 |
|  | 83.91 |
| 1% Melamine | 97.26 |
|  | 96.20 |
| 2% Melamine | 98.54 |
|  | 98.97 |
| 3% Melamine | 103.36 |
|  | 103.88 |
| 3% Melamine less 1 equimolar amount of urea | 99.21 |
|  | 100.16 |
| 3% Melamine less 2 equimolar amount of urea | 97.38 |
|  | 97.67 |
| 3% Melamine less 3 equimolar amount of urea | 98.17 |
|  | 98.09 |

Note that 2% ammonium sulfate was used throughout, all burns were for 10 minutes at 200° C., prereact time was overnight.
1. Weight of residue as a percent of original sample binder solids.

TABLE 2

Fiberglass Samples With Experimental Binders

| Time after production | Test | 1st Control | 2% Melamine | 4% Melamine | 2nd Control |
|---|---|---|---|---|---|
| Immediate | Recovery | 7.69 sd = 0.23 | 7.94 sd = 0.20 | 7.90 sd = 0.18 | 7.90 sd = 0.21 |
|  | Droop (Sawhorse) | 3.14 sd = 0.64 | 3.16 sd = 0.64 | 3.01 sd = 0.40 | 3.22 sd = 0.32 |
|  | Sag (Cantilever) | 1.95 sd = 0.74 | 1.29 sd = 0.35 | 1.23 sd = 0.40 | 1.41 sd = 0.32 |
|  | LOI (wt %) | 6.04 sd = 0.21 | 6.21 sd = 0.26 | 5.26 sd = 0.31 | 5.63 sd = 0.39 |
| 1 Week | Recovery | 7.49 sd = 0.30 | 7.66 sd = 0.30 | 7.58 sd = 0.18 | 7.48 sd = 0.12 |
|  | Droop (Sawhorse) | 3.63 sd = 0.47 | 2.99 sd = 0.57 | 2.71 sd = 0.55 | 3.29 sd = 0.47 |
|  | Sag (Cantilever) | 1.86 sd = 0.60 | 1.77 sd = 0.76 | 1.45 sd = 0.40 | 1.78 sd = 0.41 |
|  | LOI (wt %) | 7.18 sd = 0.31 | 6.55 sd = 0.20 | 7.12 sd = 0.41 | 6.73 sd = 0.30 |
| 1 Month | Recovery | 7.37 sd = 0.16 | 7.48 sd = 0.20 | 7.48 sd = 0.19 | 7.40 sd = 0.18 |
|  | Droop (Sawhorse) | 4.55 sd = 0.28 | 3.32 sd = 0.17 | 3.65 sd = 0.23 | 4.10 sd = 0.21 |
|  | Sag (Cantilever) | 1.79 sd = 0.54 | 1.82 sd = 0.33 | 1.60 sd = 0.40 | 1.72 sd = 0.52 |
|  | LOI (wt %) | 5.72 sd = 0.11 | 6.22 sd = 0.11 | 5.95 sd = 0.29 | 6.00 sd = 0.33 |

Recovery and rigidity data are shown in inches. For rigidity, the lower the number, the more rigid the sample.

The results shown in Table 2 indicate that melamine additions to standard fiberglass binder are not detrimental to product performance. In fact, both recovery and rigidity appear to be slightly improved versus control samples.

While the best modes for carrying out the invention have been described in detail, those familiar with the art to which the invention pertains will recognize various alternative embodiments for practicing the invention as defined by the following claims without departing from the spirit of the invention.

We claim:

1. A method for manufacturing an aqueous binder solution suitable for applying to fiberglass as a binder, said binder having high binding efficiency, wherein said aqueous binder solution is prepared by the steps of:

(A) first selecting an aqueous resole having a pH greater than 7, prepared by reacting phenol with excess formaldehyde under alkaline conditions;

(B) subsequently adding to said aqueous resole (A) urea in an amount from about 20 to about 70 parts by weight based on 100 parts by weight of the phenol/formaldehyde resole solids in component A and reacting to form a urea-extending prereact;

(C) thereafter dissolving into said prereact from about 1 to about 10 weight percent melamine based on the weight of the solids in the urea-extended phenol/formaldehyde prereact (B);

wherein said alkaline resole contains sufficient excess formaldehyde to react with said urea and said melamine on a substantially equimolar basis.

2. The method for manufacturing the binder of claim 1 wherein said added alkaline resole (A) contains from about 30 to about 60 weight percent solids and has a pH in the range of 7.1 to 9.

3. The method for manufacturing the binder of claim 1 wherein said added alkaline resole (A) contains approximately 15% by weight unreacted formaldehyde based on solids, and wherein the amount of urea added (B) is approximately 30 weight percent based on solids (A).

4. The method for manufacturing the binder of claim 1 wherein melamine is added in an amount of approximately 1 to 4% by weight based on solids content of the prereact (B).

5. The method for manufacturing the binder of claim 2 wherein melamine is added in an amount of approximately 1 to 4% by weight based on solids content of the prereact (B).

6. The method for manufacturing the binder of claim 3 wherein melamine is added in an amount of approximately 1 to 4% by weight based on solids contents of the prereact (B).

7. A method for manufacturing an aqueous binder solution suitable for applying to fiberglass as a binder, said binder having high binding efficiency, wherein said binder solution comprises: preparing a prereact by first mixing (A) from 50 to about 80 parts by weight based on solids of a water-soluble resole having a pH greater than 7, prepared by reacting phenol with excess formaldehyde under alkaline conditions, said resole containing or adjusted to contain sufficient unreacted formaldehyde to react with (B) from 15 to about 40 parts by weight urea;

(C) from 1 to 4% by weight, based on the weight of solids A and B, of melamine; and subsequently adding (D) water in an amount such that the total of solids in said binder is within the range of 10 weight percent to 50 weight percent, wherein none of said melamine is present in the solid state in said binder solution.

8. The method for manufacturing the binder solution of claim 7 wherein said added alkaline resole is present in an amount of from 60 to 70 parts, and urea is present in an amount of from 40 to 30 parts.

9. The method for manufacturing the binder solution of claim 7, wherein the binding efficiency of said binder solution is greater than about 95%.

10. The method for manufacturing the binder solution of claim 8, wherein the binding efficiency of said binder solution is greater than about 95%.

* * * * *